United States Patent [19]

Roberts et al.

[11] Patent Number: 4,645,693

[45] Date of Patent: Feb. 24, 1987

[54] ASSEMBLY AND METHOD FOR LANGMUIR-BLODGETT FILM PRODUCTION

[75] Inventors: Gareth G. Roberts, FarnhamCommon; Brian Blackburn, Spennymoor; Michael C. Petty, High Shincliffe; Brian Holcroft, Newton Aycliffe, all of United Kingdom

[73] Assignee: Vickers Public Limited Company, London, England

[21] Appl. No.: 796,899

[22] Filed: Nov. 12, 1985

[30] Foreign Application Priority Data

Nov. 13, 1984 [GB] United Kingdom ............... 8428593

[51] Int. Cl.⁴ .................. B05C 3/12; B05D 1/20
[52] U.S. Cl. .................... 427/402; 118/402; 118/403; 118/426; 427/434.3
[58] Field of Search ............ 118/402, 403, 426; 427/402, 407.1, 434.3

[56] References Cited

U.S. PATENT DOCUMENTS 4,093,757  6/1978  Barraud et al. ............... 118/402 X
4,511,604  4/1985  Barraud et al. ............... 118/402 X Primary Examiner—Michael R. Lusignan
Attorney, Agent, or Firm—Pollock, Vande Sande and Priddy

[57] ABSTRACT

A barrier assembly for a Langmuir trough is arranged for a substrate to be carried automatically to-and-fro on a dipping head over a fixed barrier into monomolecular layers A, B on a common subphase so as to stack layers ABABAB . . . on the substrate. The layers A, B are confined by the barrier and two constant perimeter areas formed by a single flexible band passing over rollers. By adjusting the positions of bridges that carry some of the rollers, the confined areas can be contracted to compress the layers A, B. In an alternative mode the substrate receives a layer from layer A while a new layer B is being formed, the substrate then being transferred to layer B while a new layer A is being formed. This involves an oscillating rather than a rotating movement of the substrate.

6 Claims, 3 Drawing Figures

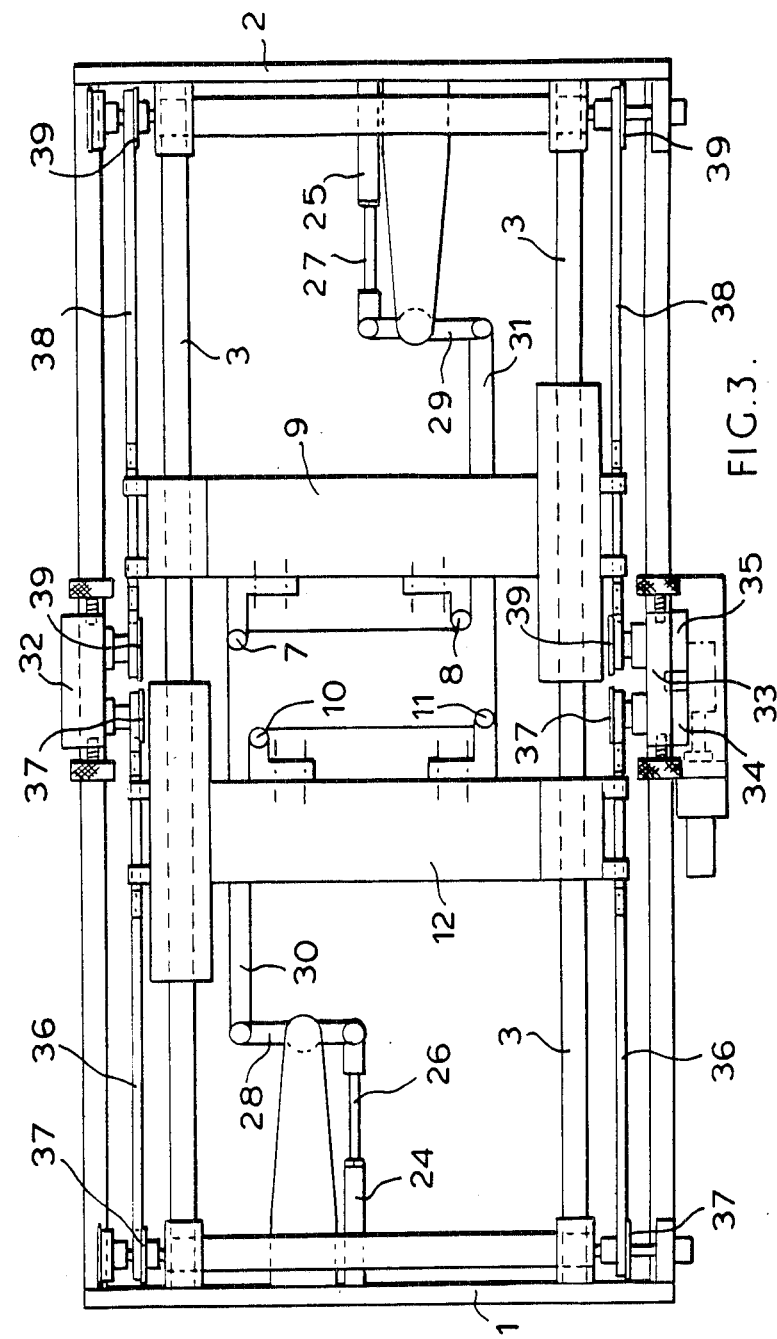

ASSEMBLY AND METHOD FOR LANGMUIR-BLODGETT FILM PRODUCTION

FIELD OF THE INVENTION

This invention relates to Langmuir-Blodgett film production and more particularly to barrier assemblies for mounting on Langmuir troughs.

DESCRIPTION OF THE PRIOR ART

A Langmuir trough, as is well known, is a container for the subphase (usually highly purified water) used in the production of Langmuir-Blodgett films. The basis of the technique is to select an organic compound having rod-like molecules which have hydrophilic and hydrophobic ends and to deposit a dilute solution of this compound in a volatile solvent on the subphase. The solvent is then allowed to evaporate so that a monomolecular layer is produced on the subphase. This layer has to be compressed in its own plane to form a quasi-solid one molecule thick. It is then possible to cause this layer to be deposited on the substrate by dipping the substrate through the film.

SUMMARY OF THE INVENTION

An object of the invention is to develop the Joyce-Loebl constant perimeter barrier system which is used for confining and compressing a monomolecular layer on the subphase, so as to accommodate two such layers in an arrangement for stacking the layers alternately one above the other in a continuous series on a substrate, for example, building one thousand layers, forming a film approximately one micron thick, on the substrate.

According to the invention, a barrier assembly for use on a Langmuir trough and arranged to confine two adjacent but separate areas each for containing a monomolecular film on a subphase comprises a barrier to be mounted in a fixed location for separating the two areas and on each side of the fixed barrier a flexible barrier which with the fixed barrier defines the shape of the associated one of the areas, the flexible barrier being maintained under tension about rollers or other guide elements, and controlled means for adjusting the relative positions of the rollers or other guide elements to reduce each area for planar compression of a monomolecular film in the area. Very advantageous results can be achieved by arranging the fixed barrier to incorporate a dipping head mounted to oscillate or rotate about an axis in the fixed barrier to carry a substrate in sequence through the monomolecular films in the said two areas, the mounting of the dipping head being such as to maintain an unbroken barrier between the two areas. This enables a substrate to be passed alternately by automatic means through the two monomolecular layers to build up alternate layers of different molecular types on the substrate more quickly than with conventional systems. Moreover this enables the polarization built into the layered structure to be controlled, for example, to produce pyroelectric materials suitable for incorporation in thermal imaging devices. Using identical molecules in the two areas also enables multilayers of a single material to be deposited efficiently.

In another application of the assembly considerable time economy can be achieved by arranging a substrate to receive a deposit in one area while a new film is being spread and compressed in the other area. In this case the rotating substrate oscillates through the subphase containing the condensed monolayer and is then repositioned to oscillate through the subphase in the other area while a new film is being formed in the first area.

According to a further aspect, the invention provides a method for producing a Langmuir-Blodgett film on a substrate, the method comprising forming two monomolecular films on a subphase in a Langmuir trough, the films being separated by a barrier mounted in a fixed location and each film being confined on its side of the fixed barrier by a flexible barrier maintained under tension about rollers or other guide elements, adjusting the relative positions of the rollers or other guide elements to effect controlled planar compression of the molecular films and alternately passing the substrate through the two films whereby the substrate receives layers from the two films in sequence.

BRIEF DESCRIPTION OF THE DRAWINGS

In order that the invention may be clearly understood and readily carried into effect, apparatus in accordance therewith will now be described, by way of example, with reference to the accompanying drawings, in which:

FIG. 3 is a plan of apparatus for supporting and driving the barrier assembly of FIGS. 1 and 2.

DESCRIPTION OF THE PREFERRED EMBODIMENT

Figure 1:
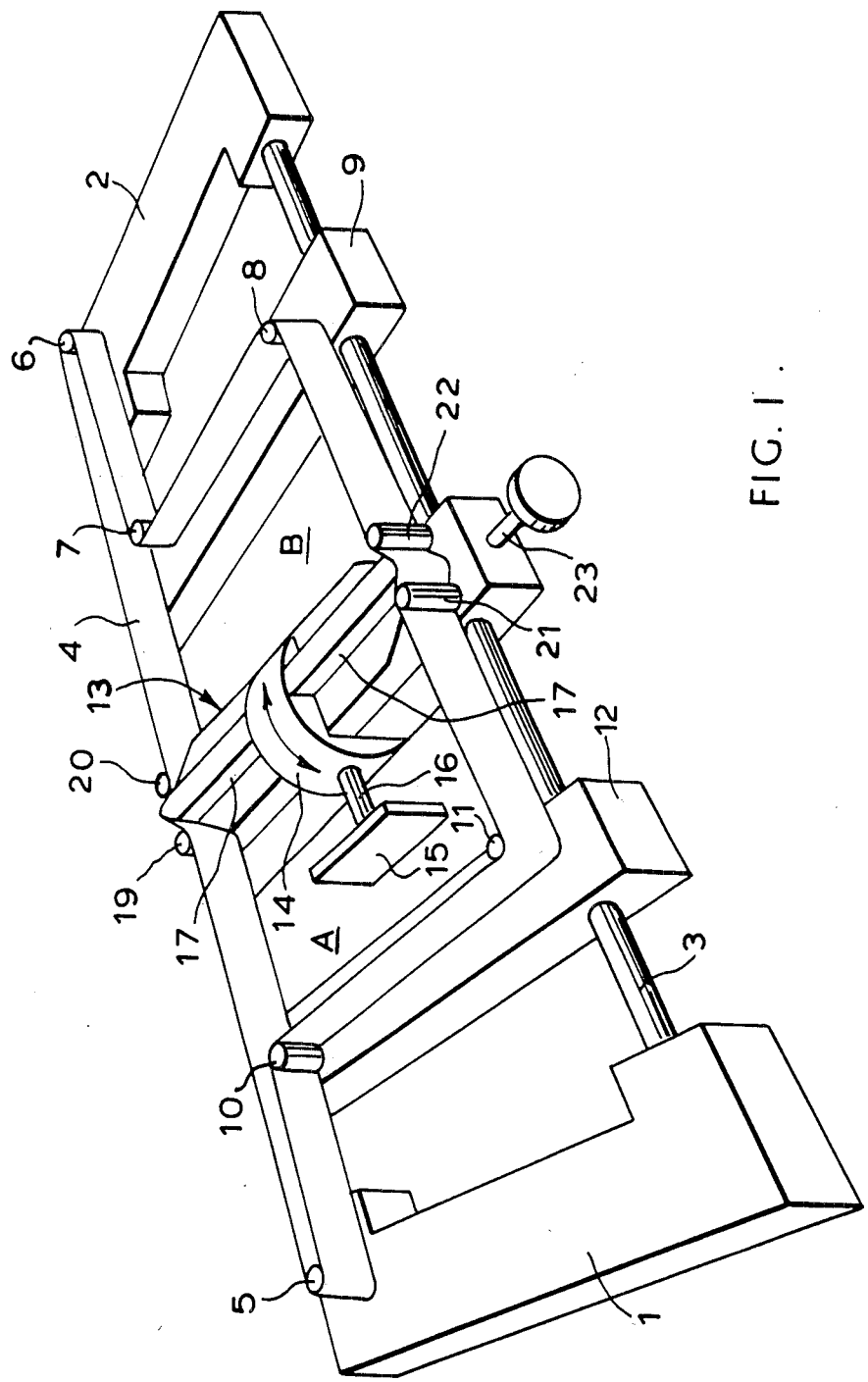
FIG. 1 is a schematic perspective view from below of a barrier assembly for mounting in a Langmuir trough.
Figure 2:
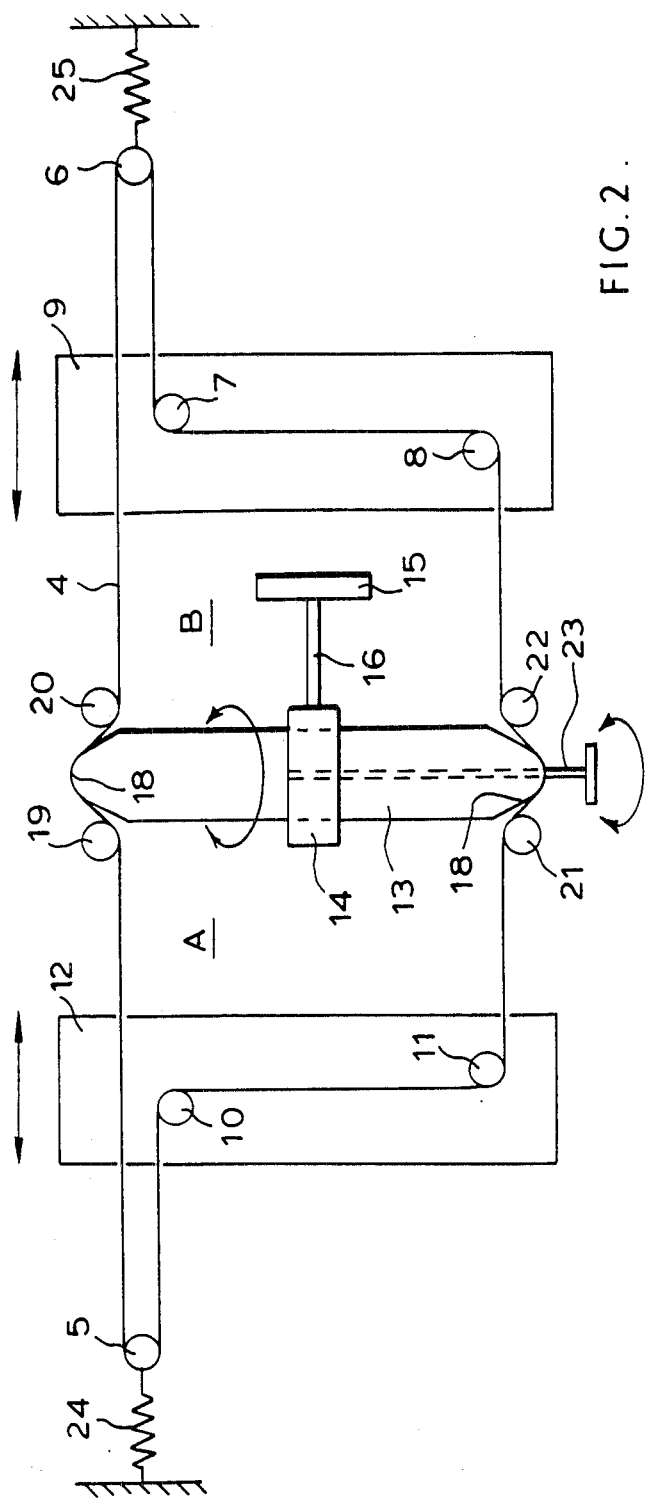
FIG. 2 is a diagrammatic plan of the barrier assembly of FIG. 1.

Referring to FIGS. 1 and 2, a frame consisting of fixed end pieces 1, 2 joined by parallel rods 3 is mounted on a Langmuir trough so that the lower edges of two constant perimeter areas or compartments, consisting of a single PTFE coated glass fibre loop 4, are immersed in the subphase contained in a suitable Langmuir trough (not shown) made of glass or PTFE. The closed loop 4 extends under tension round rollers 5, 6 on the end pieces 1, 2, rollers 7, 8 on a bridge 9 and rollers 10, 11 on a bridge 12. The bridges 9, 12 are mounted to slide along the rods 3 towards and away from a fixed central barrier unit 13 which separates two surface areas A, B within the constant perimeter barrier loop 4.

The central barrier unit 13 is divided to accommodate a rotatable cylinder 14 carrying on a rod 16a dipping head 15 for carrying a substrate. PTFE inserts 17 extending between the cylinder 14 and the ends of the unit cooperate with the constant perimeter barriers to confine the films or molecular layers on the areas A, B in complete isolation from one another. So as to maintain complete seals of the ends of the central barrier unit arcuate surfaces 18 are formed at the ends of the unit and rollers 19, 20, 21, 22 are mounted on the unit so as to keep the loop 4 tightly held around the arcuate surfaces. A coaxial spindle 23 on the cylinder 14 extends to and through one end of the barrier unit 13 beneath the constant perimeter barrier loop 4 to enable the substrate to be operated as described below.

The tension in the material 4 of the constant perimeter barrier is maintained by springs 24, 25 shown in FIG. 2 as acting on the rollers 5, 6 and in FIG. 3 as acting on the bridges 12, 9 by way of rods 26, 27, two-armed levers 28, 29 and links 30, 31. The monomolecular layers in the areas A, B can be compressed in their own planes by moving the bridges 12, 9 towards the fixed central barrier unit 13 which is mounted at its ends on supports 32, 33 (FIG. 3). The bridges 12, 9 are moved independently of one another by separate reversible motors 34, 35 in the support 33. The motor 34 drives endless bands 36, fixed to the bridge 12, by way of pulleys 37 and the motor 35 drives endless belts 38 fixed to the bridge 9, by way of pulleys 39.

The cylinder 14 carrying the dipping head 15 is rotated or oscillated about its axis by a motor 4 and gearbox mounted in the support 33. The rotating or oscillating motion is transmitted from the gearbox through a detachable coupling to the spindle 23.

In the operation of the assembly, after two different solutions of organic molecules have been spread respectively on the areas A and B of the subphase and the solvents have been allowed to evaporate leaving monomolecular layers on the areas A, B, these areas are caused to contract by the movement of the bridges 12, 9 towards the fixed barrier 13 to cause planar compression of each monomolecular film until it reaches a required quasi-solid state as indicated by a Wilhelmy or analogous balance. This balance is connected electrically to control the associated motor 34 or 35. Then the cylinder 14 is caused to oscillate so that the substrate carried by the dipping head 15 is caused to dip alternately through the monomolecular films A and B.

In the case where the cylinder 14 is rotated continuously in one direction so that the substrate is dipped first through one film and then withdrawn through the other film during each revolution, alternate layers (i.e. ABABAB . . . stacks) are produced on the substrate, each layer being only one molecule thick. Multilayer assemblies made in this way are of interest in many developing fields, such as electro-optics and ferroelectricity. Diffraction measurement of the deposited films has shown that using the same kind of monolayer in the two areas or compartments results in films of equal quality to be deposited and superior to those deposited using a conventional vertical movement of the substrate.

When operating a Langmuir trough it is often necessary to wait for some minutes while a new solution is deposited on the surface of the subphase. However, in another method of using the assembly described above, this delay can be considerably shortened. Thus, it is possible to coat a substrate in one of the areas, e.g. A, while a new film is being formed in the other area, e.g. B. Then, when the new film has been properly spread and compressed in the area B, the cylinder 14 can be swung over for the same or another substrate to pick up the film in the area B while a new film is formed in area A. This procedure involved the substrate oscillating through a limited arc rather than rotating continuously.

It will be seen that the arrangements of the rollers i.e. 19, 5, 10, 11, 21 or 20, 6, 7, 8, 22 on opposite sides of the fixed barrier 13 result in a constant variation of the area A or B with movement of the bridge 12, or 9 if the very small areas between the rollers 5 and 10, or 6 and 7 is ignored.

We claim:

1. A barrier assembly for use on a Langmuir trough and arranged to confine two adjacent but separated areas each for containing a monomolecular film on a subphase in the trough, the assembly comprising a rigid barrier to be mounted in a fixed location for separating said two areas, two flexible barriers respectively located on opposite sides of said rigid barrier, each flexible barrier being connected at opposite ends respectively to opposite ends of said rigid barrier to form therewith a constant perimeter defining the associated one of said areas, two groups of guide elements mounted respectively on opposite sides of said rigid barrier, the one of said flexible barriers on the same side of said rigid barrier as a given one of said groups extending over the guide elements in that group to be held in position thereby, and two control means respectively associated with said two groups of guide elements, each control means being connected to selected ones of the guide elements in the associated groups to move said selected guide elements to change the shape of said constant perimeter so as to reduce the contained area for planar compression of a monomolecular film in that area.

2. A barrier assembly according to claim 1, in which said two flexible barriers on opposite sides of said rigid barrier are constituted by a single flexible loop sealed to opposite ends of said rigid barrier.

3. A barrier assembly according to claim 2, in which said ends of said rigid barrier are each formed with a curved surface over which said loop passes, and the assembly comprises two pairs of pressure elements located respectively at opposite ends of said rigid barrier, the pressure elements in each said pair being fixed respectively on opposite sides of the associated curved surface to hold adjacent part of said loop tightly in engagement with said curved surface.

4. A barrier assembly according to claim 1, including a dipping head mounted to turn about an axis in said rigid barrier to carry a substrate in sequence through monomolecular films respectively in said two areas.

5. A barrier assembly according to claim 1, in which each said control means includes an adjustable member mounted for movement towards and away from said rigid barrier and an adjustment mechanism for determining the position of said adjustable member, each said group of guide elements including a fixed guide member and two guide elements mounted on the one of said adjustable members on the same side of said rigid barrier, each said flexible barrier extending from one end of said fixed barrier substantially perpendicular thereto to the associated fixed guided member round which said flexible barrier is folded to extend parallel to itself to one of said two guide elements to be deflected thereby to extend parallel to said fixed barrier to the second of said two guide elements and thence perpendicular to said rigid barrier to the other end of said rigid barrier.

6. A method of forming a composite Langmuir-Blodgett film layer on a substrate comprising forming two monomolecular films on a subphase in a Langmuir trough while keeping said films separate by a fixed rigid barrier, surrounding each film by an individual flexible barrier fixed at its opposite ends respectively to opposite ends of said rigid barrier, maintaining each flexible barrier under tension about guide elements, adjusting the relative positions of said guide elements to effect controlled planar compression of said molecular films to uniform films one molecule thick, and alternately passing the substrate through said two films whereby said substrate receives layers from said two films in sequence.

* * * * *